(12) United States Patent     (10) Patent No.:    US 9,384,076 B2
Auld et al.                                            (45) Date of Patent:       Jul. 5, 2016

(54) ALLOCATING MACHINE CHECK ARCHITECTURE BANKS

(71) Applicant: Intel Corporation, Santa Clara, CA (US)

(72) Inventors: William G. Auld, Portland, OR (US); Ashok Raj, Portland, OR (US); Malini K. Bhandaru, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/141,886

(22) Filed: Dec. 27, 2013

(65) Prior Publication Data

US 2015/0186231 A1     Jul. 2, 2015

(51) Int. Cl.
*G06F 11/00*         (2006.01)
*G06F 11/07*         (2006.01)

(52) U.S. Cl.
CPC ........ *G06F 11/0721* (2013.01); *G06F 11/0793* (2013.01)

(58) Field of Classification Search
USPC ........................................................... 714/48
See application file for complete search history.

(56) References Cited

U.S. PATENT DOCUMENTS

2013/0339829 A1*   12/2013   Vargas et al. ................ 714/807

\* cited by examiner

*Primary Examiner* — Sarai Butler
(74) *Attorney, Agent, or Firm* — Lowenstein Sandler LLP

(57) ABSTRACT

In accordance with embodiments disclosed herein, there is provided systems and methods for allocating machine check architecture banks. The processing device includes a plurality of machine check architecture banks to communicate a machine check error. The processing also includes an allocator to allocate during runtime of the processor a target machine check architecture bank of the plurality of machine check architecture banks. The runtime of the processor is during an occurrence of the machine check error.

20 Claims, 13 Drawing Sheets

US 9,384,076 B2

ALLOCATING MACHINE CHECK ARCHITECTURE BANKS

TECHNICAL FIELD

The embodiments of the disclosure relate generally to processing devices and, more specifically, relate to allocating machine check architecture banks.

BACKGROUND

A machine check architecture (MCA) bank is a hardware-based set of registers of a processor that has built-in capability to facilitate detection, reporting and attempted recovery from system errors that are observed by a central processing unit (CPU). Current MCA banks are statically-allocated such that each MCA bank in a computer system is shared by several mapped functional units. Accordingly, the MCA banks are pre-defined to identify which of the MCA banks are used for which functional units.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Disclosed herein are embodiments for allocating machine check architecture (MCA) banks. In one embodiment, MCA banks are dynamically allocated to process and communicate machine check errors (MCEs) to an operating system (OS). In one embodiment, the MCE is a hardware error. In other embodiments, the MCE includes, but is not limited to, system bus errors, error check and correction (ECC) errors, parity errors, cache errors, and translation look aside buffer errors.

MCA banks are statically allocated such that each MCA bank is shared by several mapped functional units of the processor in the computing system. A functional unit is an execution unit, which is part of a CPU that performs the operations and calculations called for by a computer program Also, there are a limited number of MCA banks in a computing system. Accordingly, the combination of static mapping from functional unit to the MCA bank and the limited number of MCA banks creates a situation in which each MCA bank is shared by several functional units in the processor. This may lead to multiple MCEs being delivered simultaneously to the same MCA banks. As certain combinations of MCEs are not fully accommodated by the MCA banks and as such are not able to be handled, these combinations simultaneously arriving at the MCA banks lead to premature shutdown, and the loss of error data associated with the MCE combinations.

Embodiments of the disclosure overcome the above problems by dynamically allocating MCA banks upon receipt of MCEs. In one embodiment, a new MCA bank is dynamically allocated for each arriving MCE up to a number of available MCA banks. In one embodiment, the MCA banks are selected based on a type of MCE. The type of MCE may include an uncorrectable error and/or a correctable error without an associated threshold.

Figure 1:
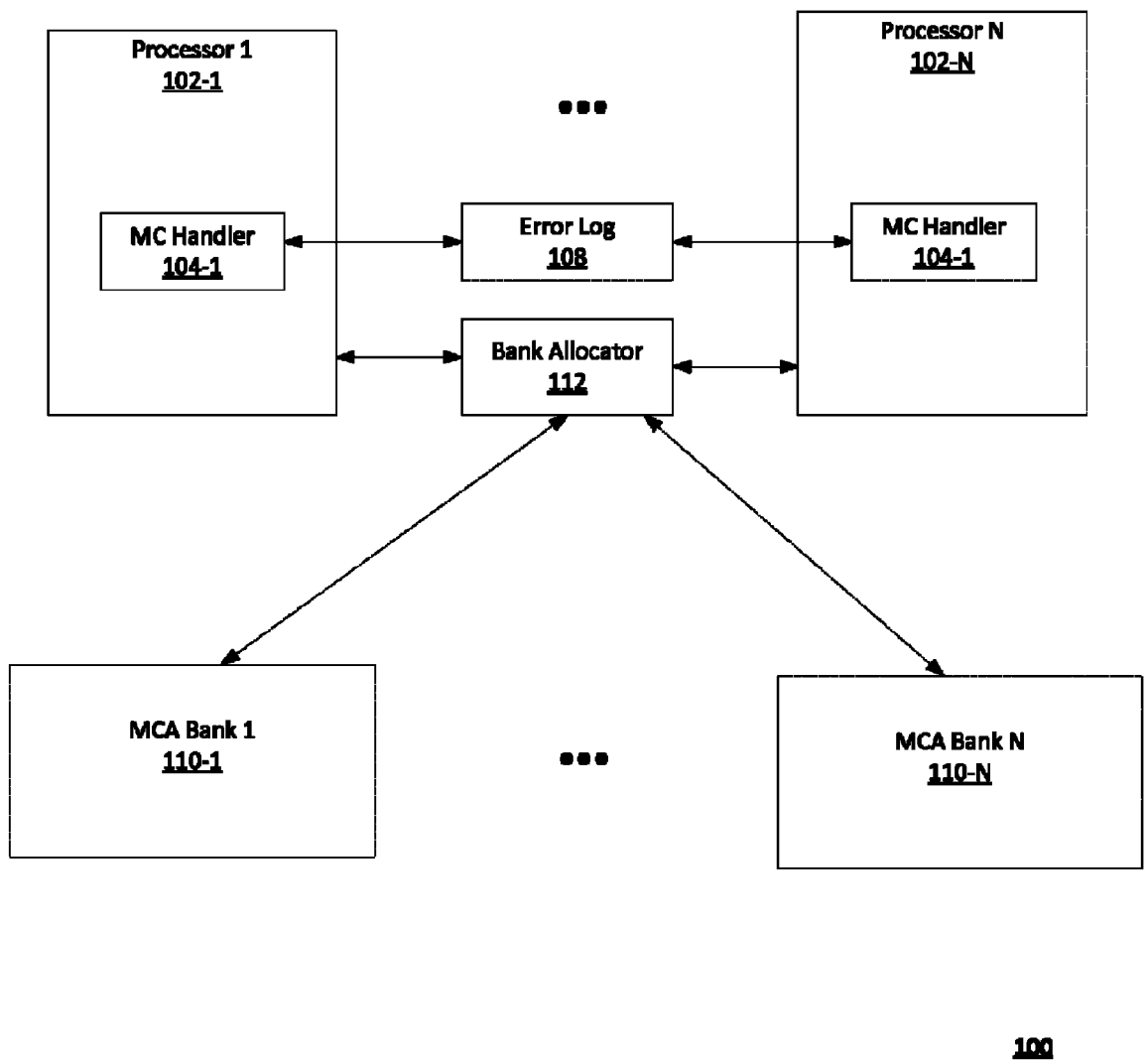
FIG. 1 is a block diagram of a system architecture, according to one embodiment of the disclosure.

FIG. 1 illustrates an example of a machine check architecture (MCA) 100 according to one embodiment of the disclosure. The MCA 100 includes a plurality of processors 1021-102N that generate MCEs. The processors 102 may be physical processors, logical processors and/or virtual processors, and may be processor cores of a larger processor, may be single core processors, or other variations.

Each processor 102-1-102-N (which may be referred to hereinafter as "processor 102" or "processors 102") may include or may have associated therewith a machine check (MC) handler 104-1-104-N (which may be referred to hereinafter as "MC handler 104" or "MC handlers 104") to process machine check exceptions, machine check interrupts and, when possible, enable the processor 102 in recovering from the MCEs. For example, the MC handler 104 may be software, code, executable instructions, or the like, included in an operating system (OS), a virtual machine monitor (VMM) or other system software. In another example, the MC handler 104 may be implemented in a hardware or firmware.

In some examples, the MC handler 104 may be specific to the particular type or class of processor 102 to interpret and respond to the machine check encodings generated for the processor 102. Further, the MC handler 104 may handle different types of MCEs, and in some cases, the MC handler 104 may include several different types of software-implemented handlers for responding to different types of MCEs. For instance, system software may provide the MC handler 104 to recover from the MCEs that are recoverable. This allows the system software to perform a recovery action on a certain class of the MCEs and continue execution. Accordingly, when software error recovery support is available for the processors 102, the MC handler 104 may initiate software error recovery. On the other hand, when there is no support for error recovery from the processors 102, the MC handler 104 may record an error data for the MCE in an error log 108 and shut down the system.

In some examples herein, the MC handler 104 may correspond to at least one of a machine-check exception handler or a corrected machine-check interrupt handler. To respond to a machine check exception, the OS or other system software such as a hypervisor or VMM, may provide the MC handler 104 for each processor 102. The MC handler 104 may further include the capability to log error data in the error log 108. Accordingly, in some embodiments, the machine check architecture 100 along with error logging can be used in several different ways, such as detecting MCEs during normal instruction execution based on machine check exceptions; checking and logging MCEs; examining MCEs to determine software recoverability; and performing recovery actions using the MC handler 104.

In some embodiments, the processors 102 may provide both internal and external machine check mechanisms, such as for checking the operation of internal chip hardware and bus transactions. When a MCE is detected, a processor may signal the occurrence of an MCE (e.g., as a vector) and return an error code.

The machine check architecture 100 also includes a plurality of MCA banks 1101-110N (which may be referred to hereinafter as "MCA bank 110" or "MCA banks 110"). MCA banks 110 may be implemented as one or more registers of processor 102. In one embodiment, the MCA banks 110 communicate the machine check error (MCE) and report error data associated with the MCE to an operating system as described in greater detail below with reference to FIG. 2.

The machine check architecture may include at least one bank allocator (BA) 112-coupled to the plurality of processors 102. The BA 112 allocates the MCA bank 110 for each of the MCEs generated in the processors 102. In one embodiment, the BA 112 receives the MCE. In one embodiment, the BA 112 dynamically allocates the MCA bank 110 for each arriving MCE up to the number of MCA banks 110 before bank sharing (i.e. reuse) is required. Dynamically may refer to occurring during run time of the system. In one embodiment, the dynamic allocation occurs during arrival of the MCE. In one embodiment, the BA 112 selects the MCA bank 110 allocated for a particular MCE. In one embodiment, the BA 112 selects the MCA bank 110 that is not statically allocated for the MCE.

In one embodiment, the BA 112 selects the MCA bank 110 using the round robin selection algorithm. In the round robin selection algorithm, the BA 112 may reuse the MCA banks 110 when the MCEs exceed the number of MCA banks 110. In one embodiment, when all the MCA banks 110 available for dynamic allocation have been used, the BA 112 dynamically allocates those used MCA banks 110 for any additionally generated MCEs. In one embodiment, the BA 112 dynamically allocates any of the used MCA banks 110. As an example, there are five MCA banks not statically allocated and six errors are received simultaneously by the BA 112 for dynamic allocation, the BA 112 allocates the five errors to the five available MCA banks and reuses one of these five MCA banks for the sixth error. In one embodiment, the BA 112 transfers the MCE to the used MCA bank 110 allocated for that particular MCE. In one embodiment, the BA 112 generates a MCE signal after transfer of the MCE to the MCA bank 110.

In one embodiment, the MCA Bank 110 that receives multiple MCEs is guided by the overwrite rules. In one embodiment, the overwrite rules define the severity of the MCEs. In one example, one of the MCE from the multiple MCEs in the MCA Bank 110 may be severe than the rest of the multiple MCEs. In such example, the overwrite rules are applied to indicate the one of the MCE to have a higher severity code than the rest of the multiple MCEs and so the one of the MCE may be processed first followed by other of the MCE from the multiple MCEs. In another example, two or more MCEs from the multiple MCEs in the MCA Bank 110 may cause a total error to be fatal. In such example, the overwrite rules are applied to indicate the total error fatality and to inform the same to the OS.

In one embodiment, the MCE is an uncorrected type error (UTE). The uncorrected type error includes an error that hardware is not able to correct, but is able to contain the error and re-steer execution to a machine check abort for firmware and OS handling. Such UTEs may be detected and signaled but may not corrupt the processor context. For certain UTEs, this may mean that once system software has performed a certain recovery action, it is possible to continue execution on the processor 102 affected by the error. The machine check handler 104 may use the error data from the MCA bank 110 to analyze and implement specific error recovery actions for UTEs. In one embodiment, the MCA banks 110 are dynamically allocated for the UTEs. Accordingly, the BA 112 may dynamically allocate the MCA banks 110 for each arriving UTEs.

In one embodiment, the MCE is a corrected type error (CTE) that may be corrected by the processor, platform hardware, firmware or the OS. CTEs pose no threat to the system once they have been corrected. Despite their harmless nature they, along with the uncorrected errors, are still made visible to software for tracking purposes. In one embodiment, the MCA banks 110 are dynamically allocated for the CTEs. Accordingly, the BA 112 may dynamically allocate the MCA banks 110 for each arriving CTEs.

In one embodiment, the CTEs have a threshold value defined in the associated MCA bank 110 that enable the error data to be delivered to the OS after the threshold value is reached. In one embodiment, the threshold value is a specific number of CTEs. The CTEs having the threshold value may be the error values written into the system prior to the OS boot up. The CTEs associated with the threshold value may be transient errors that tend to correct themselves. The OS, via the system software, may monitor the MCA banks 110 for the CTEs having the threshold. In one embodiment, the MCA banks 110 are statically allocated for the CTEs having the threshold value. Statically may refer to occurring prior to run time of the system. In one embodiment, the statically may refer to occurring prior to arrival of the MCE. Accordingly, such MCA banks 110 are already reserved for the CTEs having the threshold value. In one embodiment, the BA 112 may statically assign the MCA Bank 110, in one embodiment, the BA 112 may use a table lookup to determine the assignment of the MCA bank 110 for the particular MCE.

Figure 2:
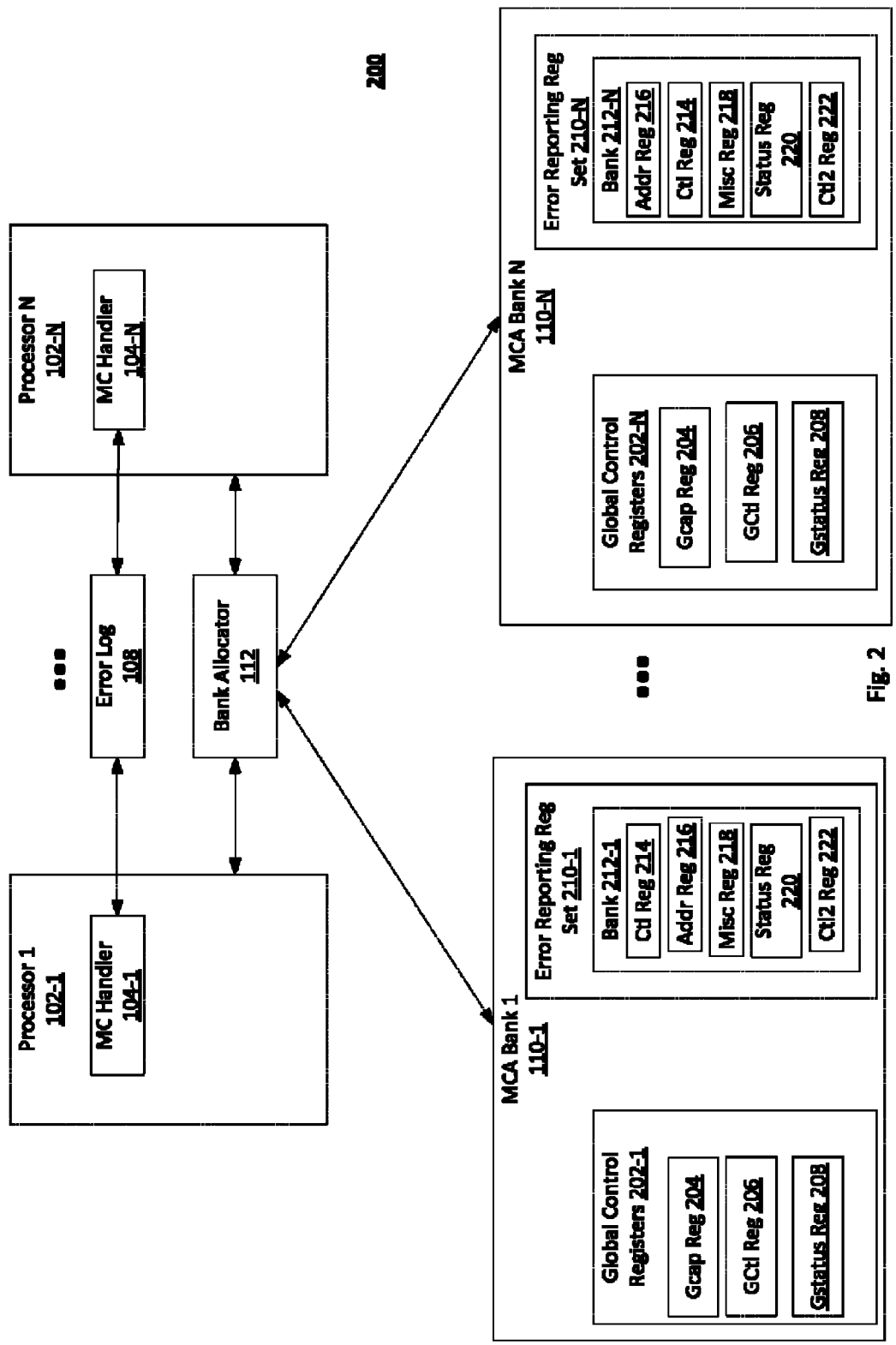
FIG. 2 is a block diagram of a system architecture, according to one embodiment of the disclosure

FIG. 2 illustrates an example of the machine check architecture 200 according to one embodiment of the disclosure. In one embodiment, the machine check architecture 200 is same as the machine check architecture 100 of FIG. 1, with additional components of the MCA bank 110 illustrated.

In one embodiment, each of the MCA banks 110 includes one or more global control registers 2021-202N (which may be referred to hereinafter as "global control register 202" or "global control registers 202"). Non-limiting examples of global control registers 202 include a global cap register (GCap Reg) 204, a global control register (GCtrl Reg) 206, and a global status register (GStatus Reg) 208. For example, the global cap register 204 may provide information about the machine check architecture of the processor 102. The global control register 206 may control the reporting of MCEs. The global status register 208 may maintain a restart instruction pointer valid flag, an error instruction pointer valid flag, and a machine check in progress flag. In one embodiment, the global control register 202 may also be a model-specific register (MSR). A MSR is any of various control registers of the processor used to control and report on performance of the processor. Further, it should be noted that the configuration of FIG. 2 is just one non-limiting example and that numerous other configurations, types of registers, types of MCA banks, and the like are possible.

In one embodiment, each of the MCA banks 110 may also include one or more error reporting bank register sets 2101-210N (which may be referred to hereinafter as "error reporting bank register set 210" or "error reporting bank register sets 210") corresponding to the processor 1021-102N. In one embodiment, each of the error reporting bank register sets 210 is associated with a specific hardware unit or a group of hardware units in the processor 102. The error reporting bank register sets 210 control error reporting for MCEs produced by a particular hardware unit in the processor 102. In some embodiments, a multi-core processor (for example processor 102) may have a set of the error reporting bank register sets 210 that correspond to that particular multi-core processor for receiving and maintaining error data pertaining to MCEs related to the particular multi-core processor when the MCE occurs.

In one embodiment, the error reporting register sets 210 may be MSRs. For instance, each processor 102 may have an error reporting register set 210 in its view, i.e., a group or set of registers that receive and/or report error information pertaining to the corresponding processor 102. The error reporting register sets 210 may include a plurality of banks 212-1-212-N (which may be referred to hereinafter as "bank 212" or "banks 212") of registers. For example, there may be 32 or more separate banks 212 of error reporting registers 210 that correspond to each processor 102.

As a non-limiting example, each bank 212 of registers may include one or more of a control register (Ctl Reg) 214, an address register (Addr Reg) 216, a miscellaneous register (Misc Reg) 218, a status register (Status Reg) 220, and a control-2 register (Ctl2 Reg) 222. The control register 214 may control error reporting for MCEs produced by a particular hardware unit or group of hardware units. The address register 216 may contain the address of the code or data memory location that produced a particular MCE. The miscellaneous register 218 may contain additional information describing the MCE to support software recovery of UEs. The status register 220 may contain information related to a MCE if its VAL (valid) flag is set. For example, the status register 220 may indicate an error code that specifies an MCA-defined error code for a particular MCE condition that is detected. The control-2 register 222 may provide a programming interface or other information to enable corrected MCE signaling. For example, the control-2 register 222 may enable the generation of a corrected machine check error interrupt (CMCI).

Each processor 1021-102N may include or may have associated therewith a bank allocator (BA) 1121-112N to allocate the MCA bank 110 for each of the MCEs. In one embodiment, the BA 112 receives the MCE. The BA 112 dynamically allocates the MCA bank 110 for each arriving MCE up to the number of MCA banks 110 before bank sharing (i.e. reuse) is required. Dynamic allocation may refer to the BA 112 allocating the MCA bank 110 during run time of the system. In one embodiment, the runtime of the system is during an occurrence of the machine check error. In one embodiment, the dynamic allocation occurs during arrival of the MCE. In one embodiment, the BA 112 dynamically allocates the banks 212 in the error reporting bank register set 210 for the MCA bank 110 for each arriving MCE. In one embodiment, the BA 112 reuses the banks 212 when the MCEs exceed the number of banks 212. For example, there may be 32 or more separate banks 212 of the error reporting register sets 210 that correspond to each processor 102. Accordingly, the BA 112 may reuse the banks 212 at least 32 times. In one embodiment, the BA 112 selects the bank 212 of the error reporting register set 210 for the particular MCE. In one embodiment, the BA 112 selects the bank 212 that is not statically allocated for the MCE. In one embodiment, the BA 112 transfers the MCE to the bank 212 allocated for that particular MCE. In one embodiment, the BA 112 generates a MCE signal after transfer of the MCE to the bank 212.

Figure 3:
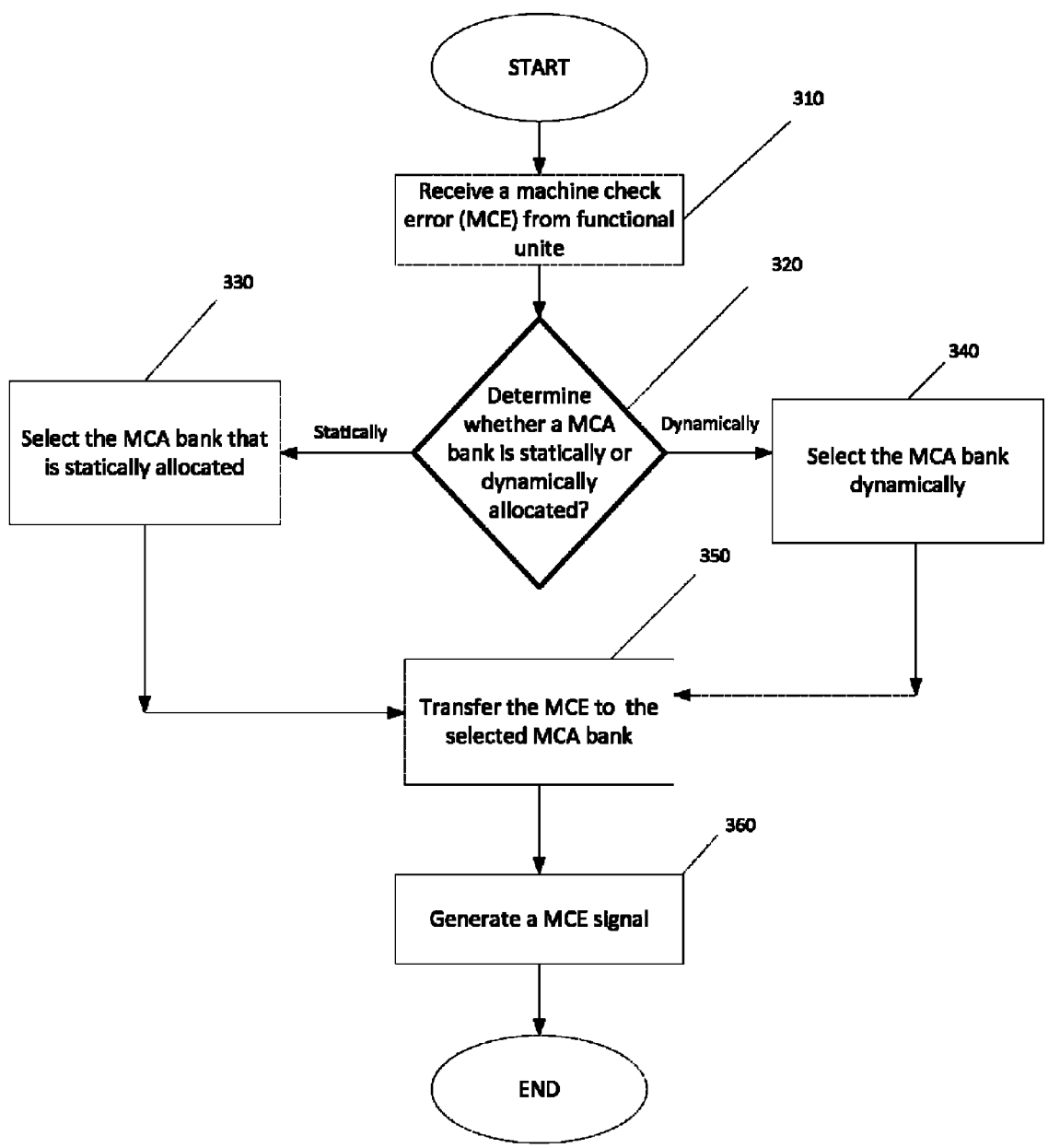
FIG. 3 is a flow diagram illustrating an example of a method for allocating machine architecture banks, according to one embodiment of the disclosure.

FIG. 3 is a flow diagram illustrating a method 300 of dynamically allocating machine architecture banks, according to one embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by processing logic of the BA 112 described above with respect to FIG. 1 and FIG. 2.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 310 of method 300, processing logic may receive a MCE from a functional unit. In one embodiment, the processing logic receives the MCE from the processor. At block 320, the processing logic determines whether a MCA bank 110 is dynamically allocated or statically allocated. At block 330, the processing logic may select a pre-defined MCA bank when it is determined at block 320 that the MCA bank 110 is statically allocated. In one embodiment, the MCA bank 110 is statically allocated when the MCE is a CE type error with a threshold. Accordingly, when the MCE is a statically allocated type, then the predefined MCA bank is assigned. In one embodiment, the processing logic may use a table lookup to determine the assignment of the MCA bank 110 for the particular MCE.

At block 340, the processing logic dynamically selects the MCA bank 110 to assign to the MCE when it is determined that the MCA bank 112 is dynamically allocated. In one embodiment, the MCE is a not statically allocated type error. In one example, the MCE is not statically allocated type when the MCE is a UE type error. In one embodiment, the MCE is not statically allocated type when the MCE is a CE type error without a threshold. In one embodiment, the processing logic selects the MCA bank 110 using the round robin selection algorithm as discussed above. Dynamic allocation may occur during run time of the system. In one embodiment, the runtime of the system is during an occurrence of the MCE. In one embodiment, the dynamic allocation occurs during arrival of the MCE.

At block 350, the processing logic transfers the MCE error information to the selected MCA bank 110. In one embodiment, the selected MCA bank contains valid error information. In one embodiment, the overwrite rules may apply to the transfer method used to update the registers in the MCA bank 110. The overwrite rules define the severity of the MCEs as discussed above. At block 360, the processing logic generates an MCE signal.

Figure 4A:
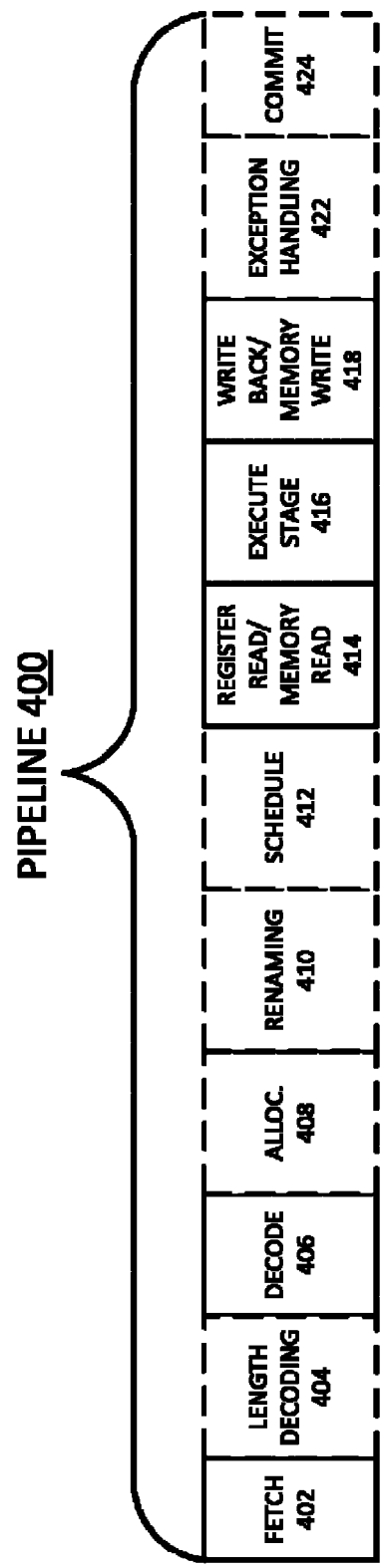
FIG. 4A is a block diagram illustrating an exemplary in order pipeline and an exemplary register renaming, out-of-order issue/execution pipeline in accordance with described embodiments.
Figure 4B:
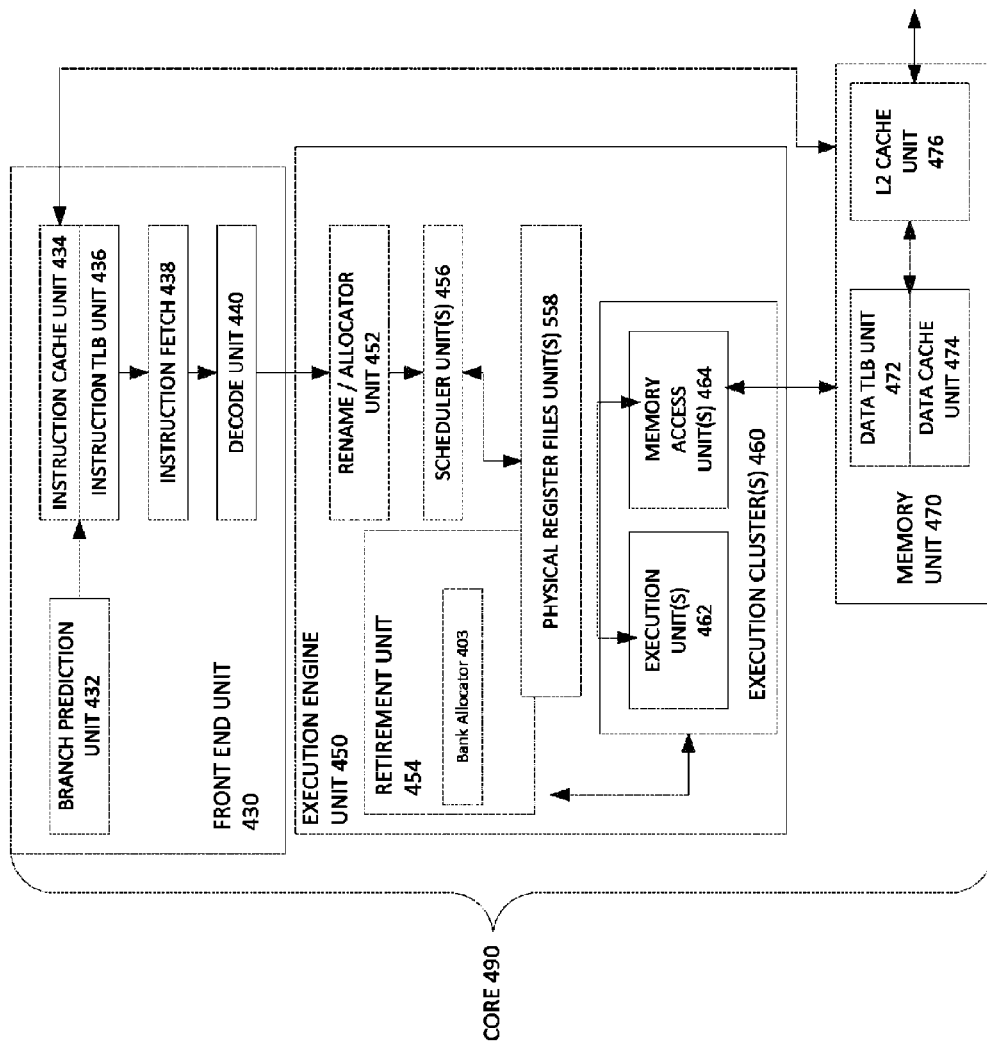
FIG. 4B is a block diagram illustrating both an exemplary embodiment of an in-order architecture core and an exemplary register renaming, out-of-order issue/execution architecture core to be included in a processor in accordance with described embodiments.

FIG. 4A is a block diagram illustrating an in-order pipeline and a register re-naming stage, out-of-order issue/execution pipeline of a processor dynamically allocating machine architecture banks according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the stages are provided in a different order and different stages may be considered in-order and out-of-order.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 70.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The retirement unit 454 may include a bank allocator 403 to dynamically allocate machine architecture banks according to embodiments of the invention. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 38 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
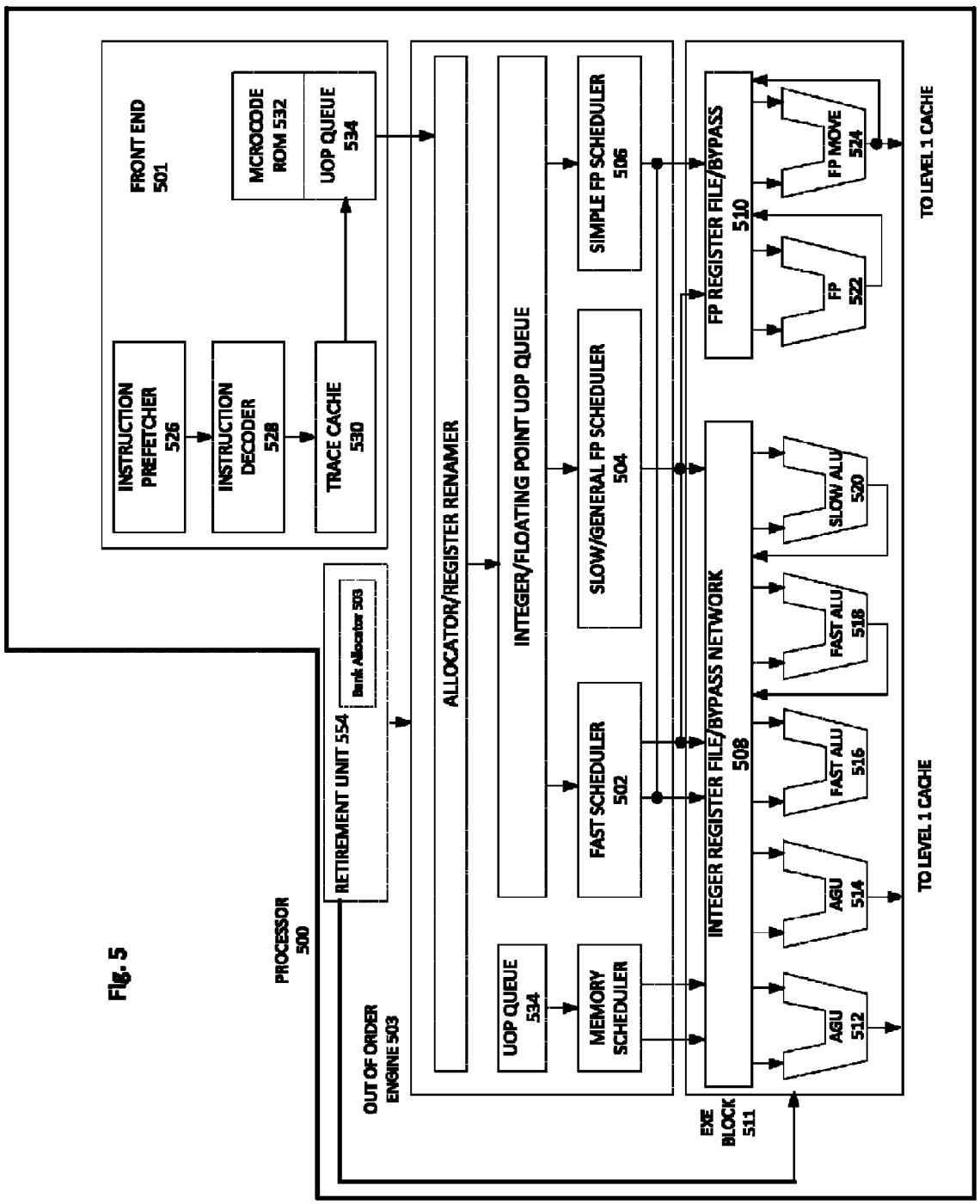
FIG. 5 is a block diagram illustrating a processor according to one embodiment.

FIG. 5 is a block diagram illustrating a micro-architecture for a processor 500 that includes logic circuits to perform instructions in accordance with one embodiment of the invention. In one embodiment, processor 500 dynamically allocates machine architecture banks. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline. The front end 501 may include several units. In one embodiment, the instruction prefetcher 526 fetches instructions from memory and feeds them to an instruction decoder 528, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others use several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the microcode ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506 determine when a uop is ready to execute based on the readiness of their dependent input register operand sources and the availability of the execution resources the uops use to complete their operation. The fast scheduler 502 of one embodiment can schedule on each half of the main clock cycle while the other schedulers can schedule once per main processor clock cycle. The schedulers arbitrate for the dispatch ports to schedule uops for execution.

Register files 508, 510 sit between the schedulers 502, 504, 506, and the execution units 512, 514, 516, 518, 520, 522, 524 in the execution block 511. There is a separate register file for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 66 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions use to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520 are described in the context of performing integer operations on 64 bit data operands. In alternative embodiments, the ALUs 516, 518, 520 can be implemented to support a variety of data bits including 16, 32, 128, 256, etc. Similarly, the floating point units 522, 524 can be implemented to support a range of operands having bits of various widths. For one embodiment, the floating point units 522, 524 can operate on 128 bits wide packed data operands in conjunction with SIMD and multimedia instructions.

In one embodiment, the uops schedulers 502, 504, 506 dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 500 may include a retirement unit 554 coupled to the execution block 511. The retirement unit 554 may include a bank allocator 503 to dynamically allocate machine architecture banks according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 6:
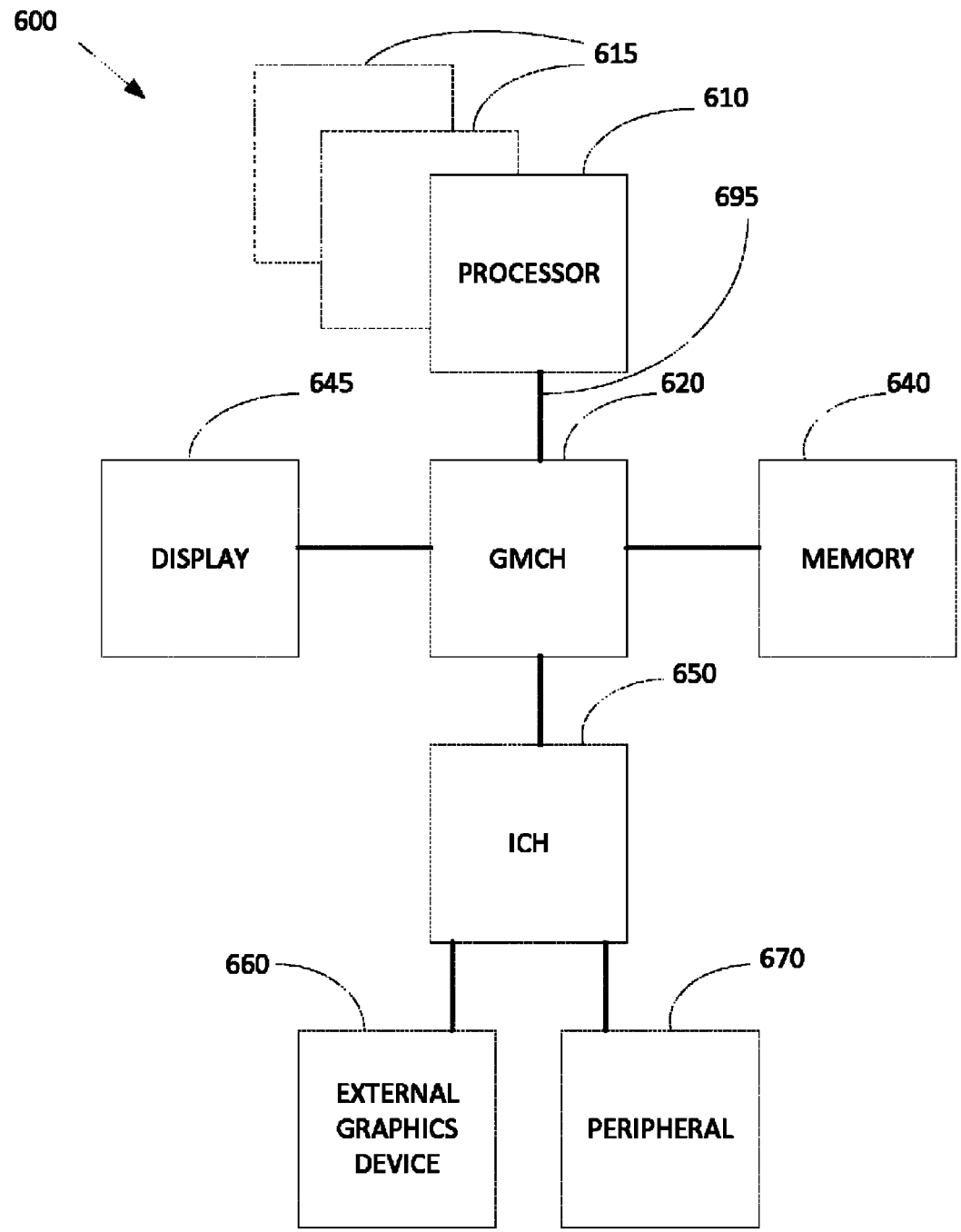
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, processors 610, 615 dynamically allocate machine architecture banks.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
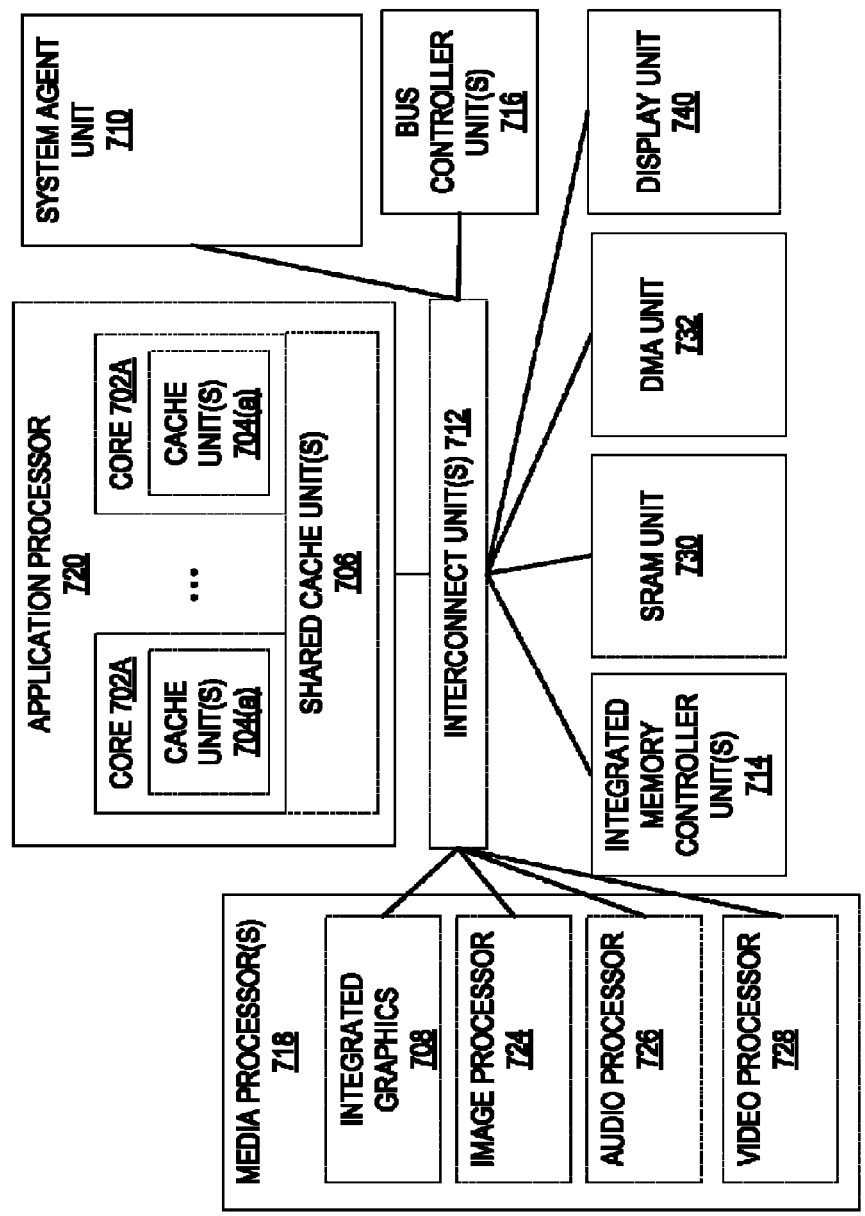
FIG. 7 is a block diagram of a system on chip (SoC) in accordance with an embodiment of the present disclosure.

Embodiments may be implemented in many different system types. FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, a memory module may be included in the integrated memory controller unit(s) 714. In another embodiment, the memory module may be included in one or more other components of the SoC 700 that may be used to access and/or control a memory. The application processor 720 may include an conditional branch, indirect branch and event execution logics as described in embodiments herein.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 720 may be from another company, such as ARM Holdings™, Ltd, MIPS™, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
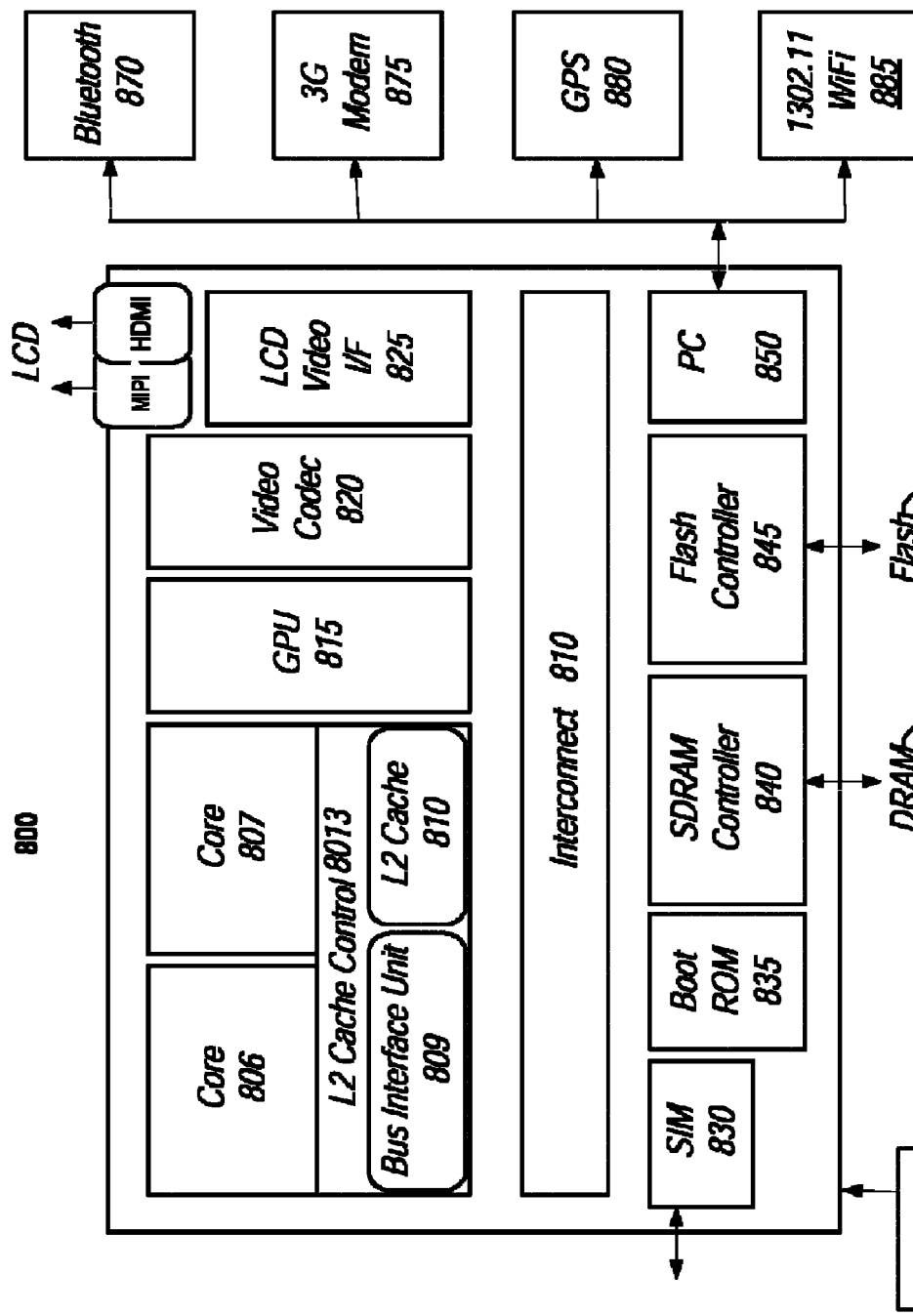
FIG. 8 is a block diagram of an embodiment of a system on-chip (SOC) design.

FIG. 8 is a block diagram of an embodiment of a system on-chip (SoC) design in accordance with the present disclosure. As a specific illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 808 and L2 cache 810 to communicate with other parts of system 800. Interconnect 810 includes an on-chip interconnect, such as an IOSF, AMBA, or other interconnect discussed above, which potentially implements one or more aspects of the described disclosure. In one embodiment, a conditional branch, indirect branch and event execution logics may be included in cores 806, 807.

Interconnect 810 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein. In addition, the system 800 illustrates peripherals for communication, such as a Bluetooth module 870, 3G modem 875, GPS 880, and Wi-Fi 885.

Figure 9:
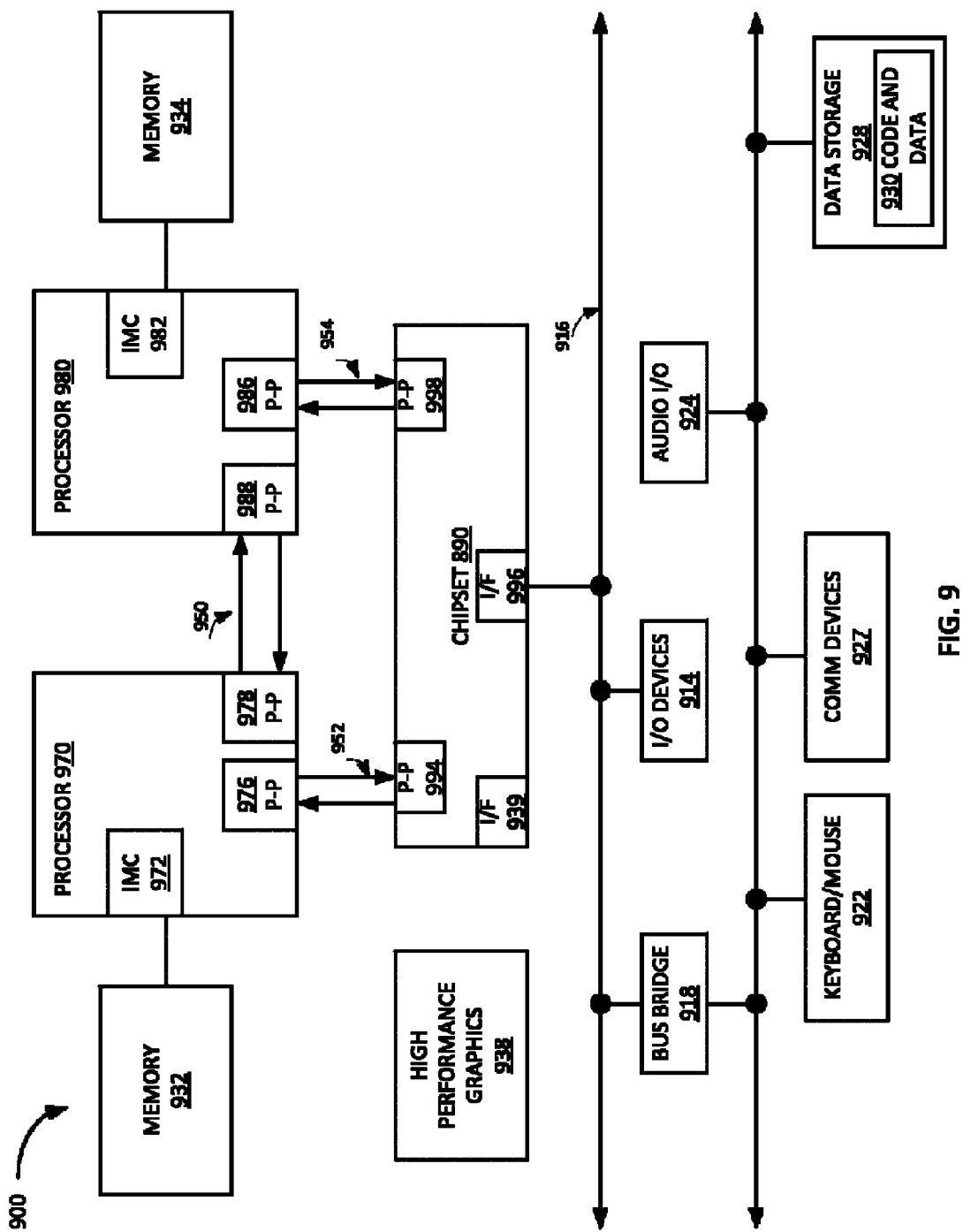
FIG. 9 illustrates a block diagram of a computer system according to one embodiment.

Referring now to FIG. 9, shown is a block diagram of a system 900 in accordance with an embodiment of the invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processors of the computing systems as described herein. In one embodiment, processors 970, 980 dynamically allocate machine architecture banks.

While shown with two processors 970, 980, it is to be understood that the scope of the disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970 and 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918, which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
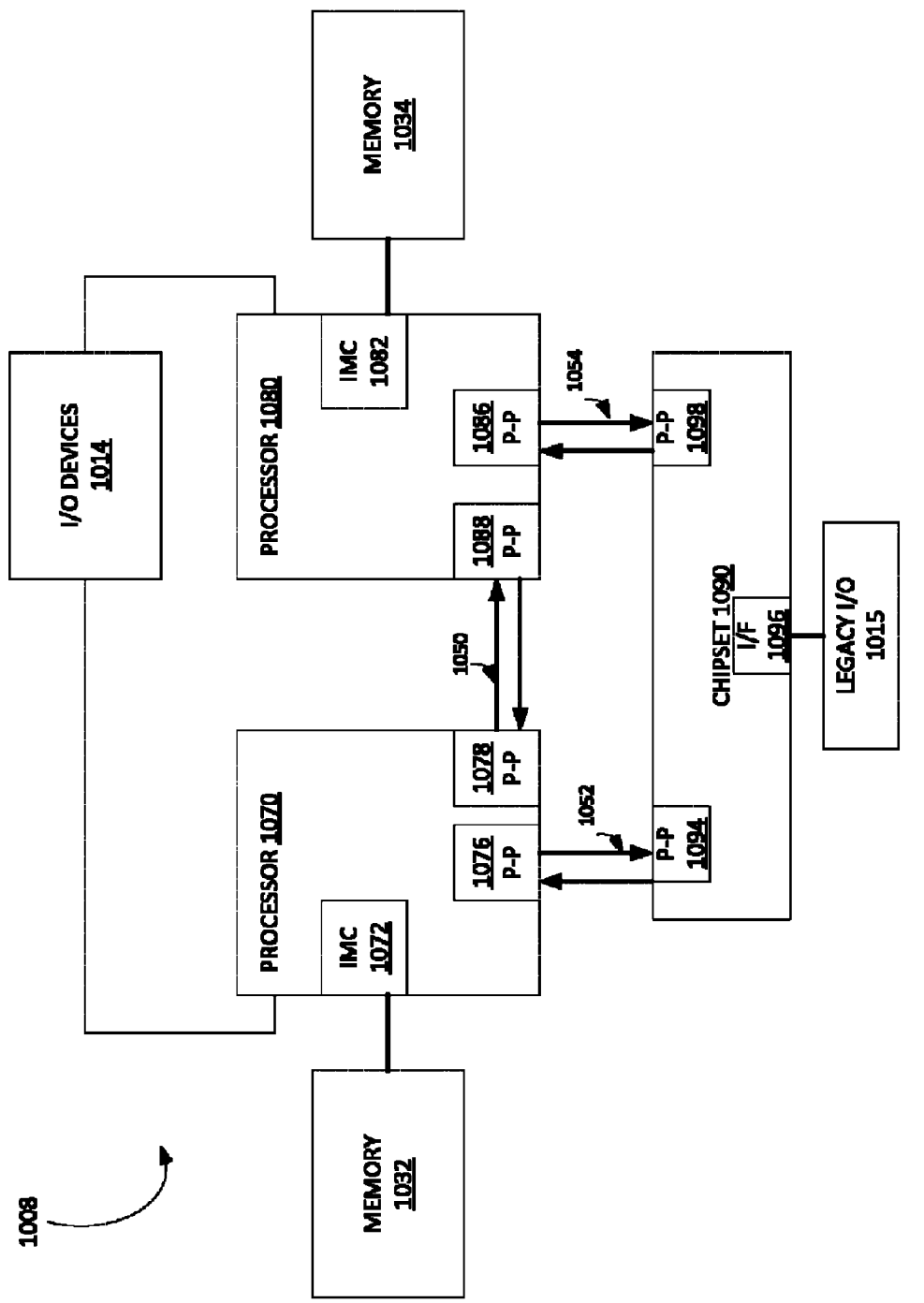
FIG. 10 illustrates a block diagram of a computer system according to one embodiment.

Referring now to FIG. 10, shown is a block diagram of a system 1000 in accordance with an embodiment of the invention. FIG. 10 illustrates processors 1070, 1080. In one embodiment, processors 1070, 1080 dynamically allocate machine architecture banks. Furthermore, processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnect 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
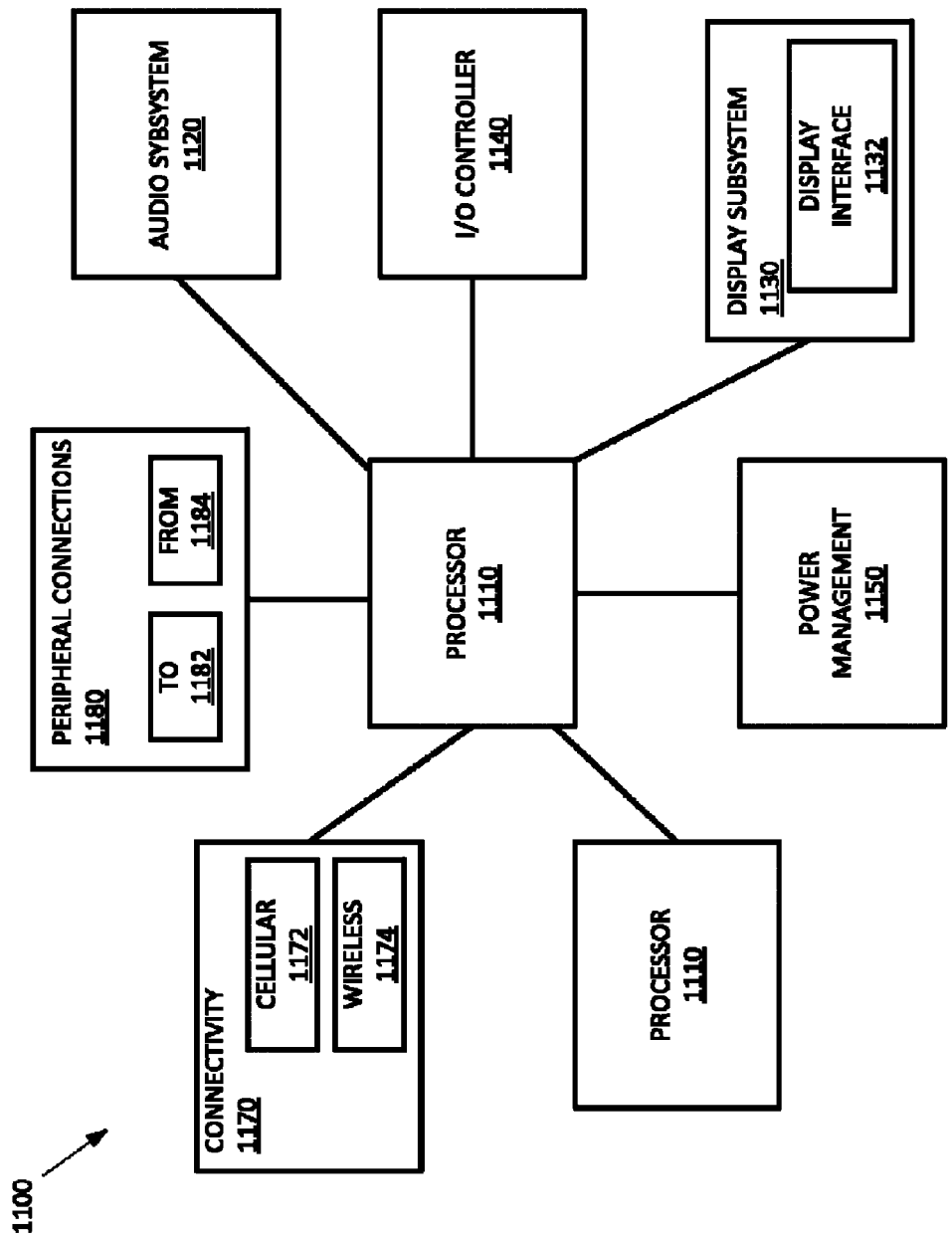
FIG. 11 illustrates block diagram of an embodiment of tablet computing device, a smartphone, or other mobile device in which touchscreen interface connectors are used.

FIG. 11 illustrates a block diagram 1100 of an embodiment of tablet computing device, a smartphone, or other mobile device in which touchscreen interface connectors may be used. Processor 1110 may dynamically allocate machine architecture banks. In addition, processor 1110 performs the primary processing operations. Audio subsystem 1120 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1110.

Display subsystem 1132 represents hardware (e.g., display devices) and software (e.g., drivers) components that provide a visual and/or tactile display for a user to interact with the tablet computing device or smartphone. Display subsystem 1130 includes display interface 1132, which includes the particular screen or hardware device used to provide a display to a user. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to the tablet computing device or smartphone through which a user might interact. In one embodiment, I/O controller 1140 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1150 that manages battery power usage, charging of the battery, and features related to power saving operation. Memory subsystem 1160 includes memory devices for storing information in the tablet computing device or smartphone. Connectivity 1170 includes hardware devices (e.g., wireless and/or wired connectors and communication hardware) and software components (e.g., drivers, protocol stacks) to the tablet computing device or smartphone to communicate with external devices. Cellular connectivity 1172 may include, for example, wireless carriers such as GSM (global system for mobile communications), CDMA (code division multiple access), TDM (time division multiplexing), or other cellular service standards). Wireless connectivity 1174 may include, for example, activity that is not cellular, such as personal area networks (e.g., Bluetooth), local area networks (e.g., WiFi), and/or wide area networks (e.g., WiMax), or other wireless communication.

Peripheral connections 1180 include hardware interfaces and connectors, as well as software components (e.g., drivers, protocol stacks) to make peripheral connections as a peripheral device ("to" 1182) to other computing devices, as well as have peripheral devices ("from" 1184) connected to the tablet computing device or smartphone, including, for example, a "docking" connector to connect with other computing devices. Peripheral connections 1180 include common or standards-based connectors, such as a Universal Serial Bus (USB) connector, DisplayPort including MiniDisplayPort (MDP), High Definition Multimedia Interface (HDMI), Firewire, etc.

Figure 12:
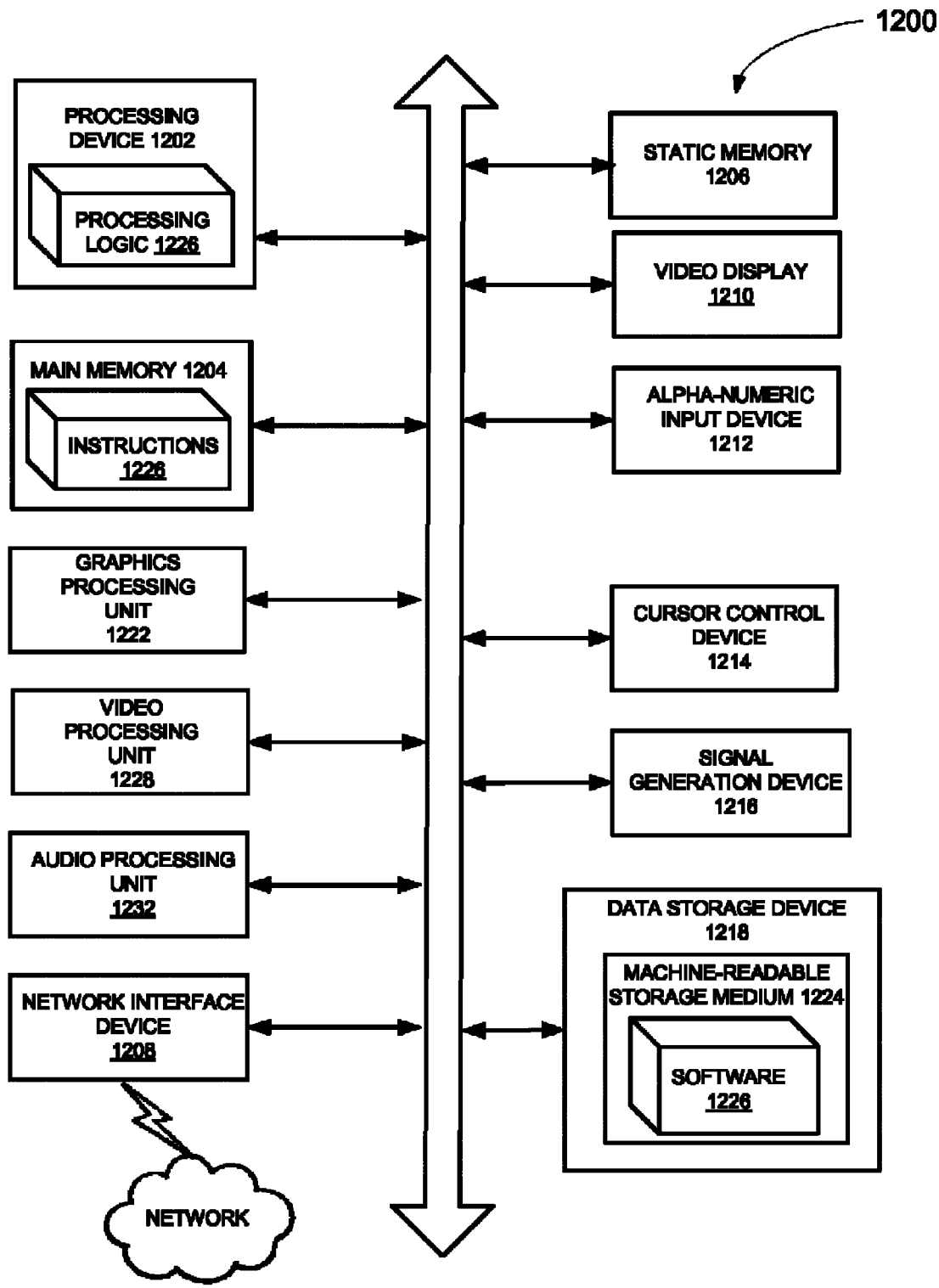
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 is the same as computer system 100 described with respect to FIG. 1 that implements the bank allocator (BA) 120. Alternatively, the computing system 1200 can include other components as described herein.

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the bank allocator (BA) 120, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments. Example 1 is a processing device allocating machine architecture banks comprising a plurality of machine architecture banks to communicate a machine check error and an allocator to allocate during runtime of the processor a target machine check architecture bank of the plurality of machine check architecture banks.

In Example 2, the subject matter of Example 1 can optionally include wherein the runtime of the processor is during an occurrence of the machine check error.

In Example, 3, the subject matter of any one of Examples 1-2 can optionally include wherein the target machine check architecture bank is not statically allocated to the machine check error.

In Example 4, the subject matter of any one of Examples 1-3 can optionally include wherein the allocator to select the target machine check architecture bank among the plurality of machine check architecture banks in view of type of the machine check error.

In Example 5, the subject matter of any one of Examples 1-4 can optionally include the plurality of machine check architecture banks comprise multiple registers to detect, process and report the machine check error.

In Example 6, the subject matter of any one of Examples 1-5 can optionally include wherein the machine check error comprises an uncorrectable error (UE).

In Example 7, the subject matter of any one of Examples 1-6 can optionally include wherein the machine check error comprises a correctable error (CE) without an associated threshold.

Example 8 is a system allocating machine architecture banks. In Example 8, the system includes a memory and a processing device communicably coupled to the memory, the processing device includes a plurality of machine check architecture banks to communicate a machine check error and an allocator to allocate during runtime of the processor a target machine check architecture bank of the plurality of machine check architecture banks.

In Example 9, the subject matter of Example 8 can optionally include wherein the runtime of the processor is during an occurrence of the machine check error.

Example 10 is a method for allocating machine architecture banks comprising receiving a machine check error communicated by a plurality of machine check architecture banks and allocating during runtime of the processor a target machine check architecture bank of the plurality of machine check architecture banks.

In Example 11, the subject matter of Example 10, can optional include wherein the runtime of the processor is during an occurrence of the machine check error.

In Example 12, the subject matter of any one of Examples 10-11 can optionally include wherein the target machine check architecture bank is not statically allocated to the machine check error.

In Example 13, the subject matter of any one of Examples 10-12 can optionally include selecting the target machine check architecture bank among the plurality of machine check architecture banks in view of type of the machine check error.

In Example 14, the subject matter of any one of Examples 10-13 can optionally include wherein the plurality of machine check architecture banks comprises multiple registers to communicate to system software for detection, processing and reporting the machine check error.

In Example 15, the subject matter of any one of Examples 10-14 can optionally include wherein the machine check error comprise an uncorrectable error (UE).

In Example 16, the subject matter of any of Examples of 10-15 can optionally include wherein the machine check error comprise a correctable error (CE) without an associated threshold.

Example 17 is a non-transitory machine-readable storage medium for allocating machine architecture banks. In Example 17, the non-transitory machine-readable medium includes data that, when accessed by a processing device, cause the processing device to perform operations comprising receiving a machine check error communicated by a plurality of machine check architecture banks and allocating during runtime of the processor a target machine check architecture bank of the plurality of machine check architecture banks.

In Example 18, the subject matter of Example 17 can optional include wherein the runtime of the processor is during an occurrence of the machine check error.

In Example 19, the subject matter of any one of Examples 17-18 an optional include wherein the target machine check architecture bank is not statically allocated to the machine check error.

In Example 20, the subject matter of any one of Examples 17-19 can optionally include wherein the operations further comprising selecting the target machine check architecture bank among the plurality of machine check architecture banks in view of type of the machine check error.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium, which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processor comprising:
a plurality of machine check architecture banks to communicate a machine check error; and
an allocator to select, based on availability of the plurality of machine check architecture banks, during runtime of the processor, a target machine check architecture bank of the plurality of machine check architecture banks to allocate to the machine check error.

2. The processor of claim 1 wherein the runtime of the processor is during an occurrence of the machine check error.

3. The processor of claim 1 wherein the target machine check architecture bank is not statically allocated to the machine check error.

4. The processor of claim 1 wherein the allocator to select, based on a type of the machine check error, the target machine check architecture bank among the plurality of machine check architecture banks to allocate to the machine check error.

5. The processor of claim 1 wherein the plurality of machine check architecture banks comprise multiple registers to detect, process and report the machine check error.

6. The processor of claim 1 wherein the machine check error comprises an uncorrectable error (UE).

7. The processor of claim 1 wherein the machine check error comprises a correctable error (CE) without an associated threshold.

8. A system comprising:
a memory; and
a processing device communicably coupled to the memory, wherein the processing device comprises:
a plurality of machine check architecture banks to communicate a machine check error; and
an allocator to select, based on availability of the plurality of machine check architecture banks, during runtime of the processing device, a target machine check architecture bank of the plurality of machine check architecture banks to allocate to the machine check error.

9. The system of claim 8 wherein the runtime of the processor is during an occurrence of the machine check error.

10. A method comprising:
receiving a machine check error communicated by a plurality of machine check architecture banks; and
selecting, based on availability of the plurality of machine check architecture banks, during runtime of a processor, a target machine check architecture bank of the plurality of machine check architecture banks to allocate to the machine check error.

11. The method of claim 10 wherein the runtime of the processor is during an occurrence of the machine check error.

12. The method of claim 10 wherein the target machine check architecture bank is not statically allocated to the machine check error.

13. The method of claim 10 further comprising selecting, based on a type of the machine check error, the target machine check architecture bank among the plurality of machine check architecture banks to allocate to the machine check error.

14. The method of claim 10 wherein the plurality of machine check architecture banks comprises multiple registers to communicate to system software for detection, processing and reporting the machine check error.

15. The method of claim 10 wherein the machine check error comprise an uncorrectable error (UE).

16. The method of claim 10 wherein the machine check error comprise a correctable error (CE) without an associated threshold.

17. A non-transitory machine-readable storage medium including data that, when accessed by a processing device, cause the processing device to perform operations comprising:
receiving a machine check error communicated by a plurality of machine check architecture banks; and
selecting, based on availability of the plurality of machine check architecture banks, during runtime of the processing device, a target machine check architecture bank of the plurality of machine check architecture banks to allocate to the machine check error.

18. The non-transitory machine-readable storage medium of claim 17 wherein the runtime of the processor is during an occurrence of the machine check error.

19. The non-transitory machine-readable storage medium of claim 17, wherein the target machine check architecture bank is not statically allocated to the machine check error.

20. The non-transitory machine-readable storage medium of claim 17, wherein the operations further comprising selecting, based on a type of the machine check error, the target machine check architecture bank among the plurality of machine check architecture banks to allocate to the machine check error.

\* \* \* \* \*